(12) United States Patent
Parks

(10) Patent No.: US 7,735,405 B2
(45) Date of Patent: Jun. 15, 2010

(54) PYROTECHNIC ACTUATOR FOR RETRACTING A PISTON

(75) Inventor: Brent Parks, Englewood, CO (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 12/048,567

(22) Filed: Mar. 14, 2008

(65) Prior Publication Data

US 2009/0229485 A1    Sep. 17, 2009

(51) Int. Cl.
*F15B 15/00*    (2006.01)
(52) U.S. Cl. ............................................. 89/1.14
(58) Field of Classification Search ................. 89/1.14; 102/530
See application file for complete search history.

(56) References Cited

U.S. PATENT DOCUMENTS

| 3,119,302 | A | * | 1/1964 | Barr ............................ 89/1.14 |
| 3,199,288 | A | * | 8/1965 | Nahas .......................... 60/635 |
| 3,354,634 | A | * | 11/1967 | McGirr ......................... 60/632 |
| 3,404,598 | A | * | 10/1968 | Angelos ....................... 89/1.14 |
| 3,541,920 | A | * | 11/1970 | Heinz et al. ................... 89/1.14 |
| 3,985,058 | A | * | 10/1976 | Corrado et al. ................ 89/1.14 |
| 4,860,698 | A | * | 8/1989 | Patrichi et al. ............... 123/24 R |
| 5,585,596 | A | * | 12/1996 | Richards et al. .............. 102/378 |
| 5,771,742 | A |   | 6/1998 | Bokaie et al. |
| 6,520,276 | B2 |   | 2/2003 | Sasaki et al. |
| 6,568,184 | B2 | * | 5/2003 | Blackburn et al. .............. 60/636 |
| 6,851,372 | B2 | * | 2/2005 | Bender et al. ................ 102/530 |
| 6,907,817 | B2 |   | 6/2005 | Parks |
| 7,246,677 | B2 |   | 7/2007 | Fredriksson et al. |
| 2003/0029307 | A1 | * | 2/2003 | Daoud ......................... 89/1.14 |
| 2005/0016371 | A1 | * | 1/2005 | Borg et al. .................... 89/1.14 |
| 2006/0032693 | A1 |   | 2/2006 | Parks et al. |

(Continued)

FOREIGN PATENT DOCUMENTS

JP     2003-247509 A     9/2003

(Continued)

OTHER PUBLICATIONS

Written Opinion of the International Searching Authority and International Search Report for International Application No. PCT/US2009/036978, dated Jul. 7, 2009, 9 Pages.

*Primary Examiner*—Bret Hayes
*Assistant Examiner*—Reginald Tillman, Jr.
(74) *Attorney, Agent, or Firm*—Sally J Brown; Harness Dickey & Pierce

(57) ABSTRACT

A safety arrangement for a motor vehicle includes a pyrotechnic actuator for retracting a hinge pin of a vehicle hood. The pyrotechnic actuator includes a housing defining a longitudinal axis and further includes a first end defining an opening. The pyrotechnic actuator additionally includes a piston disposed in the housing for movement along the longitudinal axis between an extended position and a retracted position. The piston carries the pin. The pin at least partially extends from the housing in the extended position. The piston includes a base portion defining a combustion chamber. The pyrotechnic actuator further includes a pyrotechnic charge disposed in the combustion chamber for producing a combustion gas operative to move the piston from the extended position to the retracted position. The combustion chamber is defined by a thin walled member that is sealed to contain the ballistic event.

12 Claims, 5 Drawing Sheets

U.S. PATENT DOCUMENTS

2006/0131086 A1    6/2006  Lutter et al.
2007/0241548 A1*  10/2007  Fong .......................... 280/777
2008/0047269 A1    2/2008  Borg et al.
2008/0238058 A1*  10/2008  Numoto et al. ............. 280/737

FOREIGN PATENT DOCUMENTS

JP      2006-266501 A      10/2006
JP      2007-333044 A      12/2007
WO    WO 2007-025963      3/2007

* cited by examiner

PYROTECHNIC ACTUATOR FOR RETRACTING A PISTON

FIELD

The present teachings generally relate to a pyrotechnic actuator for retracting a piston. More particularly, the present teachings relate to a safety arrangement for a motor vehicle including a pyrotechnic actuator for retracting a hood hinge pin.

BACKGROUND

The statements in this section merely provide background information related to the present disclosure and may not constitute prior art.

Certain strategies are known to reduce the severity of pedestrian impacts with motor vehicles. For example, it is known to provide a motor vehicle with a front hood that raises a predetermined distance to provide for energy absorption in anticipation of a vehicle impact with a pedestrian. Potential pedestrian injuries may be reduced in this manner since lifting the rear edge of the hood enhances its energy absorption characteristics.

One particular safety arrangement for reducing pedestrian injuries from impact with a motor vehicle is shown and described in commonly assigned U.S. Pat. No. 7,246,677 (the '677 patent). The '677 patent discloses a safety arrangement located beneath the hood of a motor vehicle that includes an inflatable element formed of a plastically deformable material. A gas generator supplies gas to inflate the element in response to a signal from a sensor which is responsive to impact with a pedestrian. If a pedestrian strikes the hood, the plastically deformable element will deform to absorb energy. U.S. Pat. No. 7,246,677 is incorporated by reference as if fully set forth herein.

While various motor vehicle safety arrangements for protecting pedestrians are known, there remains a need for continuous improvement in the relevant art.

SUMMARY

According to one particular aspect, the present teachings provide a pyrotechnic actuator including a housing. A combustion chamber is located within the housing. A pyrotechnic charge is disposed in the combustion chamber for producing a combustion gas. The pyrotechnic actuator additionally includes an initiator associated with the combustion chamber. The pyrotechnic actuator further includes a piston disposed in the housing for movement from an extended position to a retracted position in response to combustion of the pyrotechnic charge.

According to another particular aspect, the present teachings provide a pyrotechnic actuator for pulling a pin. The pyrotechnic actuator includes a housing defining a longitudinal axis and further includes a first end defining an opening. The pyrotechnic actuator additionally includes a piston disposed in the housing for movement along the longitudinal axis between an extended position and a retracted position. The piston carries the pin. The pin at least partially extends from the housing in the extended position includes a base portion defining a combustion chamber. The pyrotechnic actuator further includes a pyrotechnic charge disposed in the combustion chamber for producing a combustion gas operative to move the piston from the extended position to the retracted position.

According to yet another particular aspect, the present teachings provide a hinge assembly for a motor vehicle. The hinge assembly includes a first component and a second component. The second component is normally coupled to the first component at a pivot pin. The pyrotechnic actuator is operative for pulling the pin and includes a housing and a piston disposed in the housing for movement between an extended position and a retracted position. The piston defines the pin. The pin at least partially extends from the housing when the piston is in the extended position. The pyrotechnic actuator further includes a pyrotechnic charge disposed in the housing for moving the piston from the extended position to the retracted position.

Further areas of applicability of the present teachings will become apparent from the description and appended claims provided hereinafter. It should be understood that the detailed description and specific examples, while indicating the various examples of the present teachings, are intended for purposes of illustration only and are not intended to limit the scope of the teachings.

DRAWINGS

The present teachings will become more fully understood from the detailed description, the appended claims and the following drawings.

DESCRIPTION OF VARIOUS ASPECTS

Figure 1A:
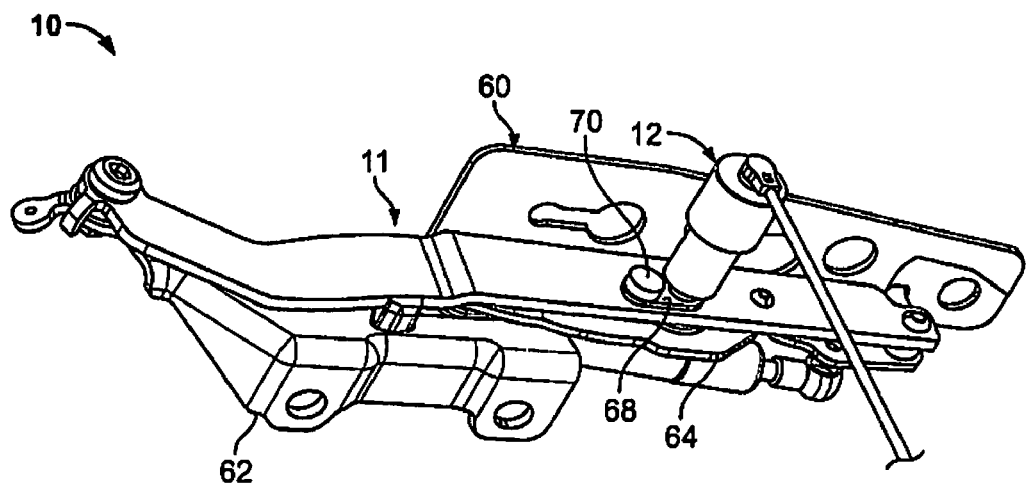
FIG. 1A is a perspective, environmental view illustrating a safety arrangement for a motor vehicle having a hood release mechanism in accordance with the present teachings.

The following description is merely exemplary in nature and is not intended to limit the present disclosure, application, or uses. It should be understood that throughout the drawings, corresponding reference numerals indicate like or corresponding parts and features. The description and any specific examples, while indicating embodiments of the present disclosure, are intended for purposes of illustration only and are not intended to limit the scope of the present disclosure. Moreover, any recitation of multiple embodiments having stated features is not intended to exclude other embodiments having additional features, or other embodiments incorporating different combinations of the stated features.

Figure 1B:
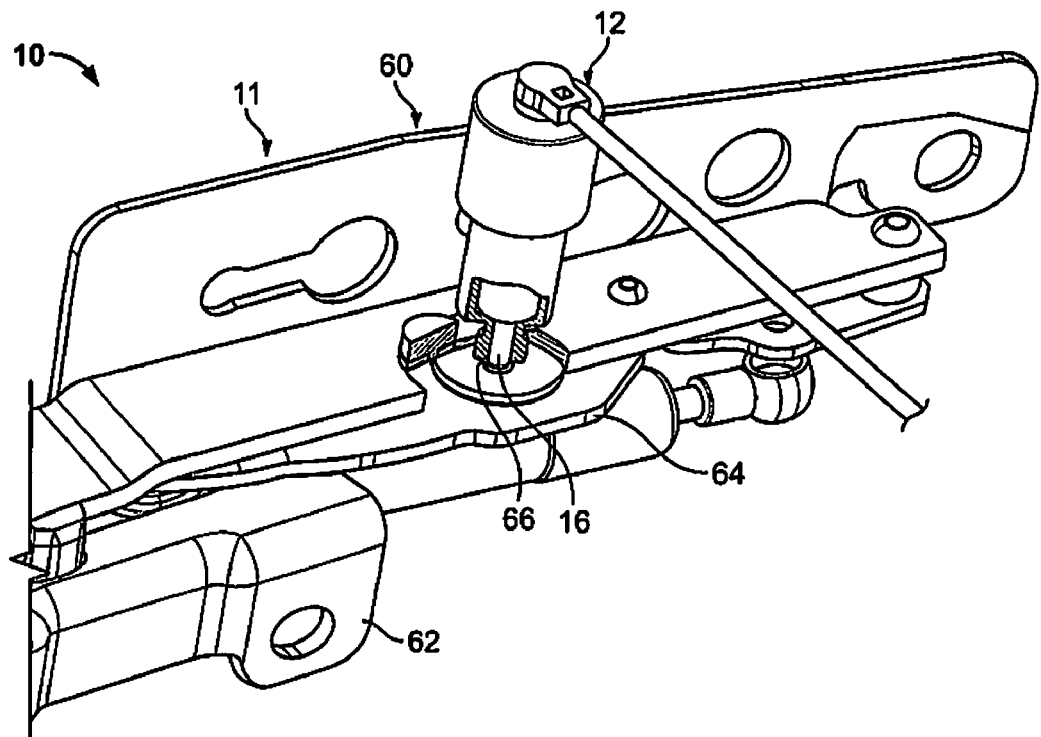
FIG. 1B is another perspective, environmental view of a safety arrangement in accordance with the present teachings, the safety arrangement shown in partial section.
Figure 2:
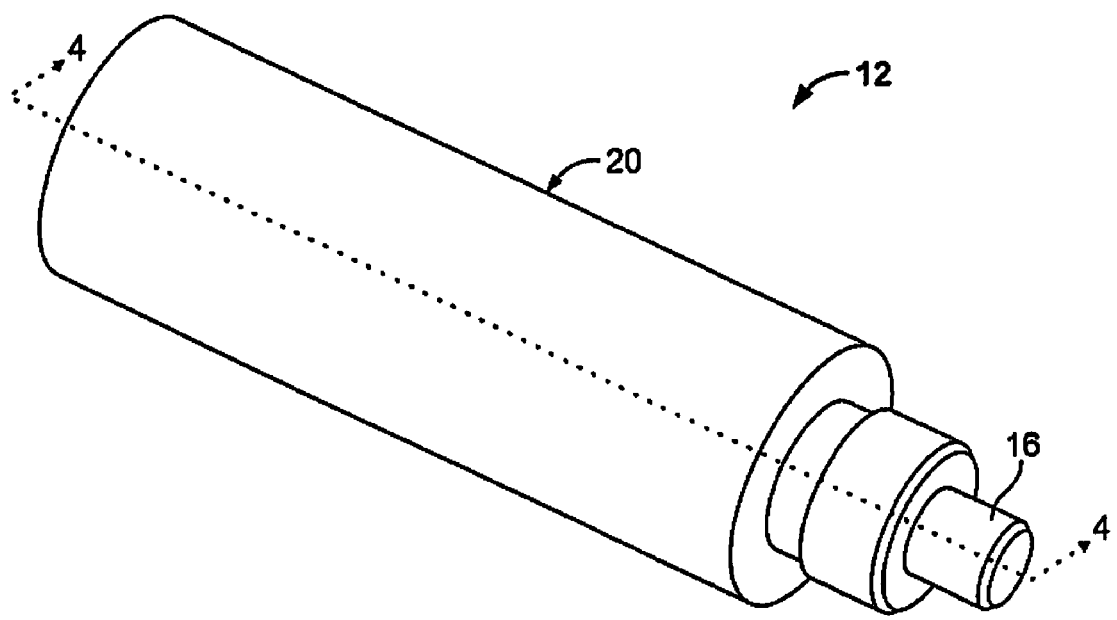
FIG. 2 is a perspective view of a pyrotechnic actuator in accordance with the present teachings.
Figure 3:
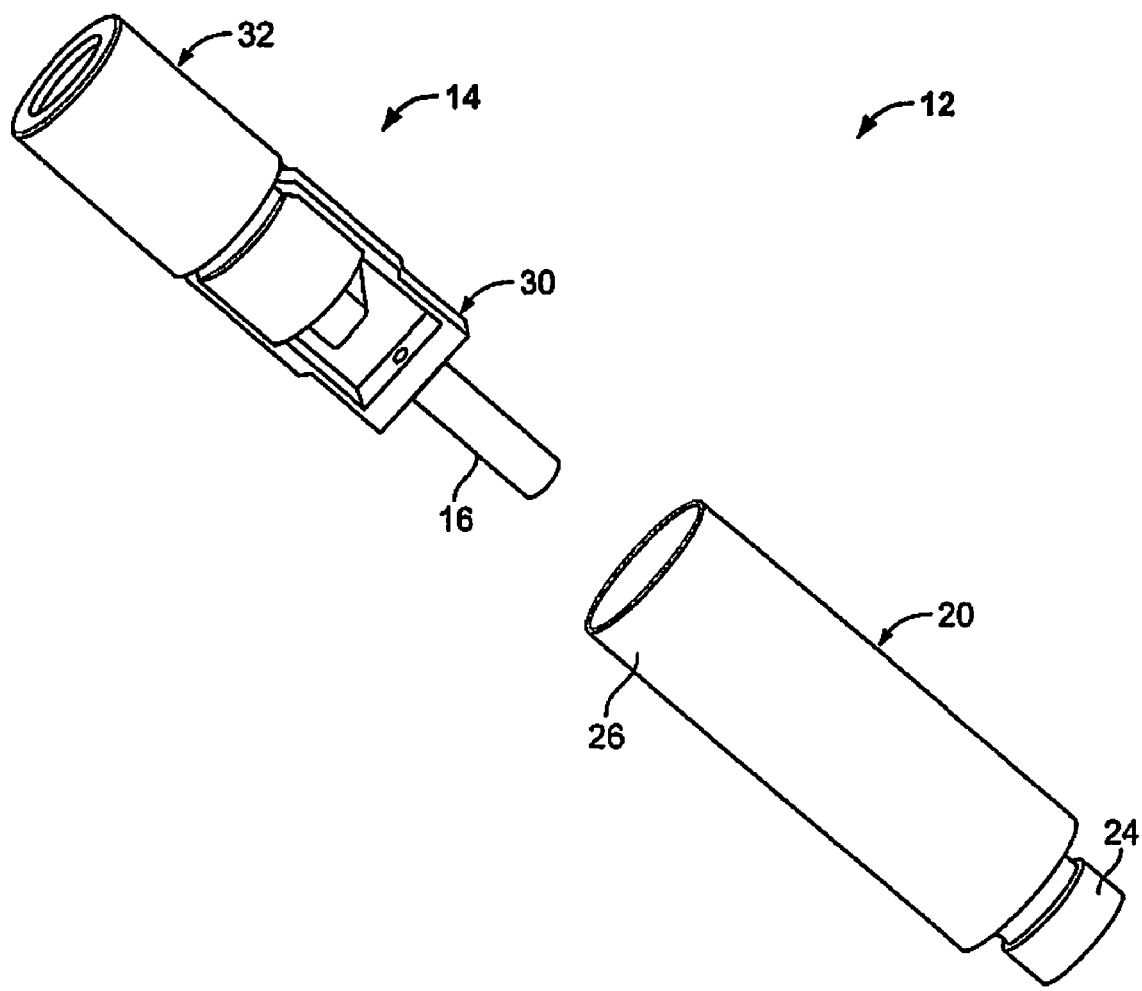
FIG. 3 is an exploded perspective view of the actuator of FIG. 2.

With initial reference to the environmental views of FIGS. 1A and 1B, a safety arrangement for a motor vehicle having a hood release mechanism constructed in accordance with the present teachings is illustrated and identified at reference character 10. The safety arrangement 10 is shown operatively associated with a vehicle hinge assembly 11 and generally includes a pyrotechnic actuator 12 with a retractable piston 14. At a distal end thereof, the piston 14 defines a hinge pin 16. As will be addressed below, the pin 16 may normally hold the hood in a conventional orientation relative to the remainder of the vehicle and the actuator 12 may be actuated in response to a collision or pending collision with a pedestrian so that the vehicle hood may subsequently be lifted into an energy absorbing position.

With continued reference to FIGS. 1A and 1B and additional reference to FIGS. 2 through 5, the pyrotechnic actuator 12 of the present teachings will be further described. The actuator 12 may be elongated along a longitudinal axis X and may generally include a housing 20. The housing 20 may be constructed of metal or other suitable material and may be generally cylindrical in shape or of any other suitable shape. The housing 20 may include a first end or distal end 24 and a second end or proximal end 26. Proximate the first end 24, the housing 20 may define an opening 28 through which the pin 16 may extend. The housing 20 may be open at the second end 26.

Figure 4:
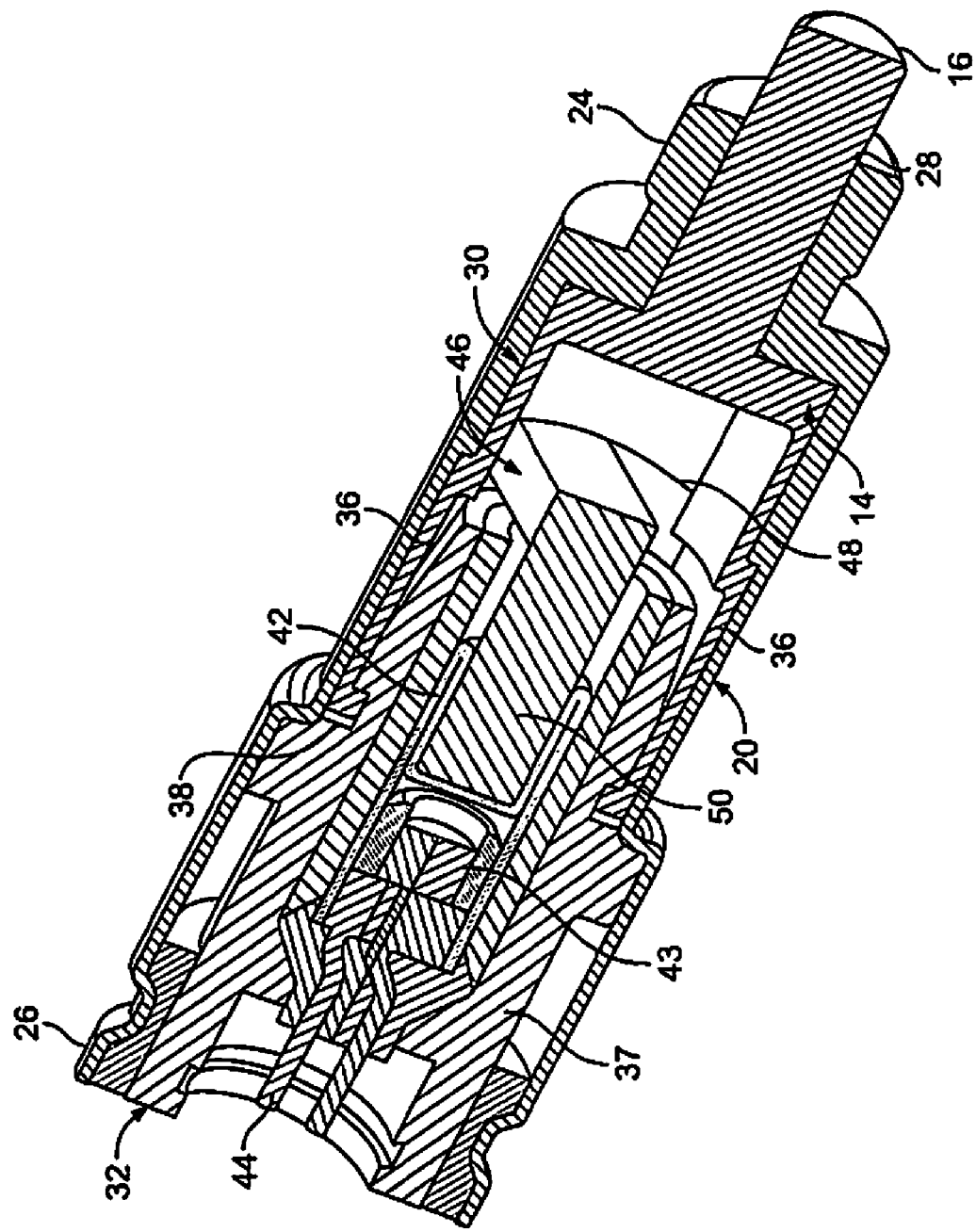
FIG. 4 is a cross-sectional view taken along the line 4-4 of FIG. 2 and illustrating a pin of the actuator in an extended position.
Figure 5:
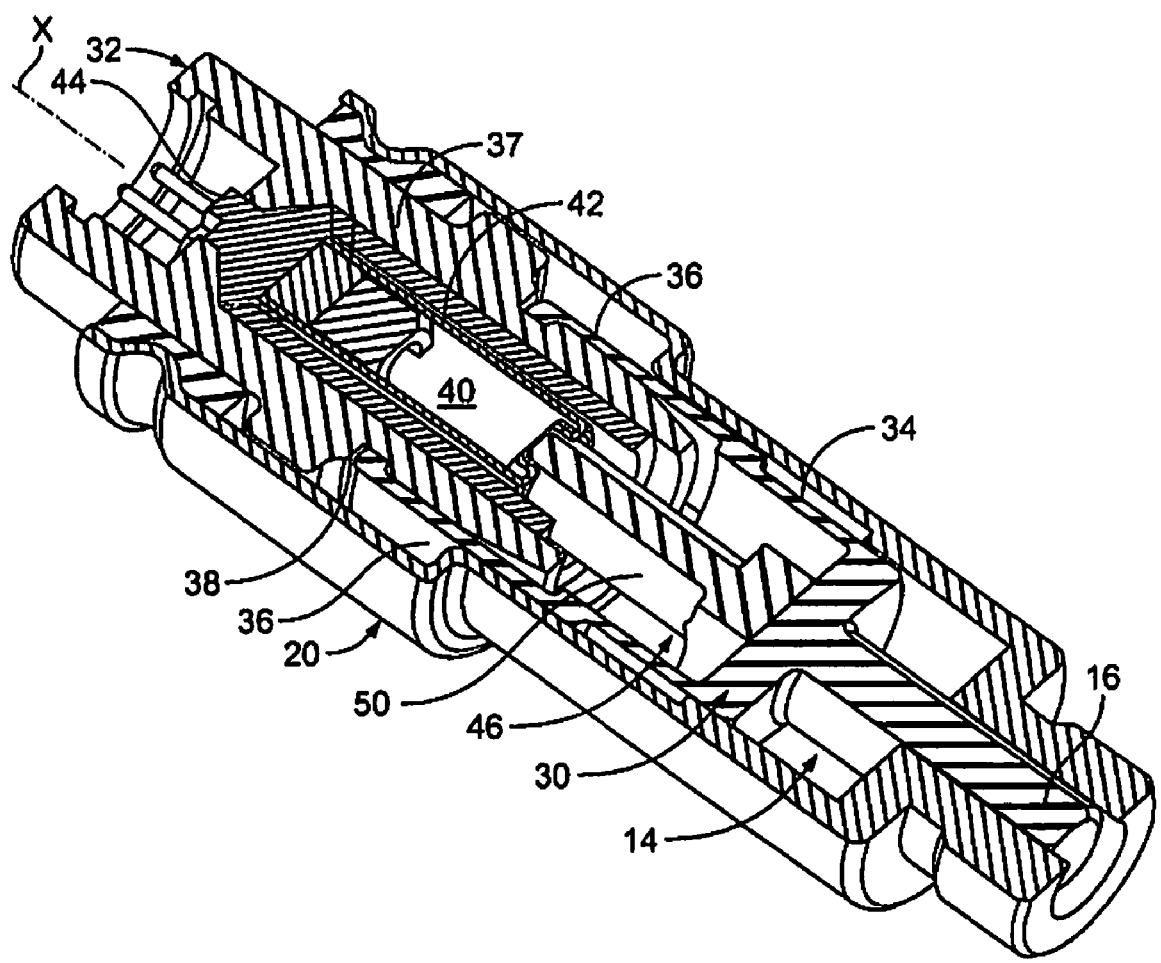
FIG. 5 is a cross-sectional view similar to FIG. 4, the pin of the actuator illustrated in a retracted position.

As will become more appreciated below, the piston 14 may be disposed in the housing 20 for movement between a retracted position and an extended position. The extended position is shown in FIG. 4, for example. The retracted position is shown in FIG. 5, for example. In the extended position, the pin 16 of the piston 14 at least partially extends from the housing 20.

The piston 14 may generally include a distal portion 30 and a proximal portion 32. As shown, the pin 16 may be integrally formed with the distal portion 30 of metal or other suitable material. Alternatively, the pin 16 may be coupled to the distal portion 30 for movement therewith. In addition to the pin 16, the distal portion 30 may include a generally U-shaped portion 34 from which the pin 16 extends. The U-shaped portion 34 may include a pair of proximally extending arms 36.

The proximate portion 32 of the piston 14 may include a main body portion 37. The main body portion 37 may be constructed from ceramic, metal or polymeric material and may be generally cylindrical in shape or of any suitable shape. An outer surface of the main body portion 37 may define an annular groove 38. The annular groove 38 may receive inwardly extending ends of the arms 36 of the distal portion 30. In this manner, the distal and proximal portions 30 and 32 may be coupled for common movement between the extended and retracted positions. A seal 39 may be disposed between the proximal portion 32 and the housing 20.

A combustion chamber 40 may be carried by the proximal portion 32. The combustion chamber 40 may be defined by a thin-walled member 42. A pyrotechnic charge 43 may be disposed in the combustion chamber 40. The pyrotechnic charge 43 may be operative for producing a combustion gas to expand the combustion chamber 40 in the manner discussed herein.

An initiator 44 may be carried by the proximal portion 32 of the piston 14 proximate the pyrotechnic charge 43. In a conventional manner, the initiator 44 may initiate combustion of the pyrotechnic charge 43 to produce the combustion gas. As illustrated, the initiator 44 may be associated with a generally cylindrical wall. The generally cylindrical wall may define a cavity for receiving the thin-walled member 42.

In the embodiment illustrated, the thin-walled member 42 may be generally cylindrical. However, it is readily understood that the thin-walled member 42 may be of a variety of other shapes within the scope of the present teachings. For example, the thin-walled member 42 may be oval, rectangular or of other suitable shape.

The thin-walled member 42 may be formed from a single durable, rigid and malleable piece of material such as metal. The metal may be brass, cold rolled steel, stainless steel or the like. Of course, other materials, including but not limited to polymers, may alternatively be employed. The material thickness may vary depending on the intended application. Similarly, other properties such as diameter and the like may vary depending on the intended application. Generally, the material may have deep draw characteristics and may be strong enough to maintain the integrity of the thin-walled member 42 when the pyrotechnic charge expands the combustion chamber 40. The outside walls of member 42 may be sufficiently supported to prevent ballistic rupture such that there is no external ballistic event.

The cross-sectional view of FIG. 4 illustrates the pyrotechnic actuator 12 prior to combustion of the pyrotechnic charge 43. Prior to combustion, the thin-walled member 42 may include a closed end that is doubled over on itself to effectively reduce the area of the combustion chamber 40. As shown in the cross-sectional view of FIG. 5, combustion of the pyrotechnic charge 43 may function to force the closed end of the thin-walled member 42 in a distal direction (i.e., toward distal end 24) and thereby increase the volume of the combustion chamber 40. The member 42 effectively provides a moveable bladder that allows the components of the actuator 12 to move without ballistic leakage from the member 42.

The piston 14 may further include a stationary member 46. The stationary member 46 may be positioned within the housing 20 adjacent to a step 48 (see FIG. 4) or other structure so as to prevent distal displacement of the stationary member 46 upon combustion of the pyrotechnic charge 43. As will be discussed further herein, the stationary member 46 may oppose the force of the combustion to proximally displace the piston 14. The stationary member 46 may include a leg 50 or other suitable structure that extends proximally toward the combustion chamber 40.

Prior to combustion of the pyrotechnic charge 43, an end of the leg 50 may be positioned within a hollow recess defined by the closed end of the thin-walled member 42. As combustion gas is produced from the pyrotechnic charge 43, the area of the combustion chamber 40 increases and the length of the thin-walled member 42 correspondingly increases. Engagement of the leg 50 of the stationary member 46 forces the piston 14 to translate proximally in response to expansion of the combustion chamber 40. As a result, the pin 16 is pulled (e.g., drawn proximally) from the extended condition shown in FIG. 4. While the pin 16 is illustrated in FIG. 5 completely within the housing 20, it is sufficient that the pin 16 withdraw enough to produce the desired result (e.g., to disengage from the hinge of the vehicle hood).

Where the pyrotechnic actuator 12 of the present teachings is incorporated into a motor vehicle to release a hinge assembly 11 of the vehicle hood, the actuator 12 may cooperate with sensors and a control arrangement. Such technologies are commonly used for the deployment of airbags and will be understood to be conventional insofar as the present teachings are concerned. Briefly, the vehicle sensors may sense an actual or impending collision with a pedestrian. In response to this sensing, the pyrotechnic charge 43 may be actuated to pull the pin 16 from the hinge assembly 11 of the hood 18. It will be understood that the vehicle may have two or more hinges that are similarly controlled. Active lifting of the vehicle hood 18 may immediately thereafter be performed in any manner well known in the art.

In the environmental views of FIGS. 1A and 1B, an otherwise conventional hinge assembly 11 is illustrated. The hinge assembly 11 may include a hood component 60 for mounting to the vehicle hood, a body component 62 for mounting to the vehicle body, and an intermediate component 64 therebetween. The actuator 12 may be mounted to a first of the hinge components (e.g., the hood component 60) and the pin 16 may normally engage an aperture 66 defined by a second of the hinge components (e.g., the intermediate component 64).

It will be understood that the particular hinge assembly 11 shown in the drawings is merely exemplary.

Mounting of the actuator 12 may be accomplished in any suitable manner. As particularly shown in FIGS. 1A and 1B, the actuator 12 may be associated with a mounting plate 68. The mounting plate 68 may be attached to the component 60 with a rivet 70, for example. Alternatively, the mounting plate 68 may be welded or otherwise attached to the component 60. Once attached, the end 24 of the actuator 12 extend through an aperture of the component 60.

It will now be appreciated that the present teachings provide a pyrotechnic device for completely containing a ballistic event. Such an arrangement effectively eliminates the need for additional seals, other parts, and potential ballistic blow-by that is typically associated with pyrotechnic devices. As a result, the present teachings advantageously provide a pyrotechnic design that has few parts, higher reliability and is associated with lower cost.

While one or more specific examples have been described in the specification and illustrated in the drawings, it will be understood by those skilled in the art that various changes may be made and equivalence may be substituted for elements thereof without departing from the scope of the present teachings as defined in the claims. Furthermore, the mixing and matching of features, elements and/or functions between various examples may be expressly contemplated herein so that one skilled in the art would appreciate from the present teachings that features, elements and/or functions of one example may be incorporated into another example as appropriate, unless described otherwise above. Moreover, many modifications may be made to adapt a particular situation or material to the present teachings without departing from the essential scope thereof. Therefore, it may be intended that the present teachings not be limited to the particular examples illustrated by the drawings and described in the specification as the best mode of presently contemplated for carrying out the present teachings but that the scope of the present disclosure will include any embodiments following within the foregoing description and the appended claims.

What is claimed is:

1. A pyrotechnic actuator comprising:
   a housing;
   a combustion chamber located in the housing;
   a pyrotechnic charge disposed in the combustion chamber for producing a combustion gas;
   an initiator associated with the combustion chamber;
   a piston disposed in the housing for movement from an extended position to a retracted position in response to combustion of the pyrotechnic charge, the piston including a proximal portion and a distal portion, the combustion chamber carried at the proximal portion; and
   a stationary member disposed within the piston and arranged to engage a stop mechanism positioned within the housing for opposing a combustion force to proximally displace the piston;
   wherein the combustion chamber is defined by a thin walled member carried within the piston and arranged to retract with the piston such that the combustion chamber translates with the piston, the piston having a pin at least partially extending from the housing when the piston is in the extended position; and
   wherein combustion of the pyrotechnic charge moves the piston to pull the pin completely within the housing.

2. The pyrotechnic actuator of claim 1, wherein the thin walled member is sealed to contain the combustion gas of the pyrotechnic charge.

3. The pyrotechnic actuator of claim 1, wherein the thin walled member carried by the piston and defining the combustion chamber has a first internal volume prior to actuation of the pyrotechnic charge and a second, larger internal volume after actuation of the pyrotechnic charge.

4. A pyrotechnic actuator for pulling a pin, the pyrotechnic actuator comprising:
   a housing defining a longitudinal axis and including a distal end defining an opening;
   a piston disposed in the housing for movement along the longitudinal axis between an extended position and a retracted position, the piston carrying the pin, the pin at least partially extends from the housing in the extended position, the piston carrying a combustion chamber;
   a pyrotechnic charge disposed in the combustion chamber for producing a combustion gas operative to move the piston from the extended position to the retracted position; and
   a stationary member disposed within the piston and arranged to engage a stop mechanism positioned within the housing to oppose a combustion force to proximally displace the piston;
   wherein the combustion chamber is defined by a thin walled member carried within the piston and arranged to retract with the piston such that the combustion chamber translates with the piston; and
   wherein combustion of the pyrotechnic charge moves the piston to pull the pin completely within the housing.

5. The pyrotechnic actuator for pulling a pin of claim 4, wherein the piston includes a distal member defining the pin and a proximal member carrying the combustion chamber.

6. The pyrotechnic actuator for pulling a pin of claim 5, wherein the distal and proximal members of the piston are coupled for common movement between the extended and retracted positions.

7. The pyrotechnic actuator for pulling a pin of claim 4, wherein the thin walled member is operative to substantially contain the combustion gas.

8. The pyrotechnic actuator for pulling a pin of claim 7, wherein the thin walled member carried by the piston and defining the combustion chamber has a first internal volume prior to actuation of the pyrotechnic charge and a second, larger internal volume after actuation of the pyrotechnic charge.

9. The pyrotechnic actuator of claim 1, in combination with a safety arrangement for a motor vehicle having a safety device, the pin operatively associated with the safety device such that the safety device operates in a first manner and when the pin is disassociated from the safety device, the safety device operates in a second manner.

10. The pyrotechnic actuator of claim 9, wherein the pyrotechnic actuator pulls the pin to disassociate the pin from the safety device.

11. The pyrotechnic actuator for pulling a pin of claim 4, in combination with a safety arrangement for a motor vehicle having a safety device, the pin operatively associated with the safety device such that the safety device operates in a first manner and when the pin is disassociated from the safety device, the safety device operates in a second manner.

12. The pyrotechnic actuator for pulling a pin of claim 11, wherein the pyrotechnic actuator pulls the pin to disassociate the pin from the safety device.

* * * * *